Dec. 21, 1943.  P. V. MATHIAS ET AL  2,337,056
APPARATUS FOR AND METHOD OF ASSEMBLING
RADIO TUBES AND RADIO TUBE BASES
Original Filed Jan. 4, 1941   3 Sheets-Sheet 1
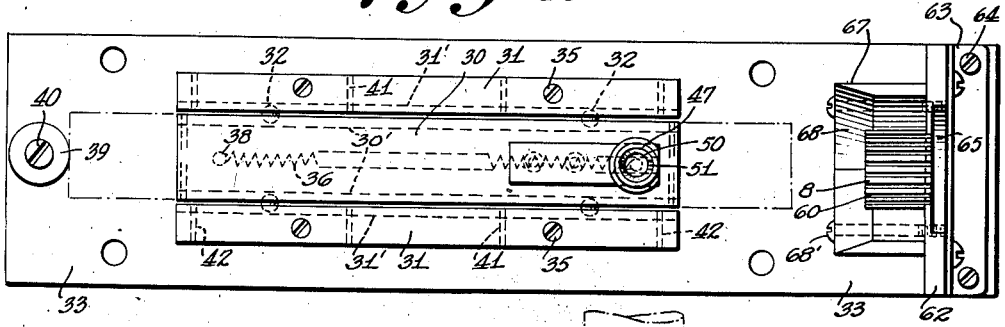
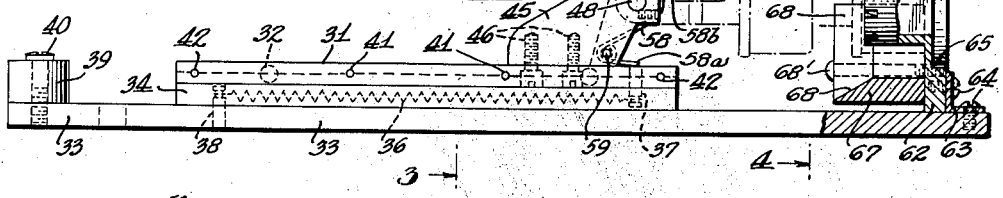
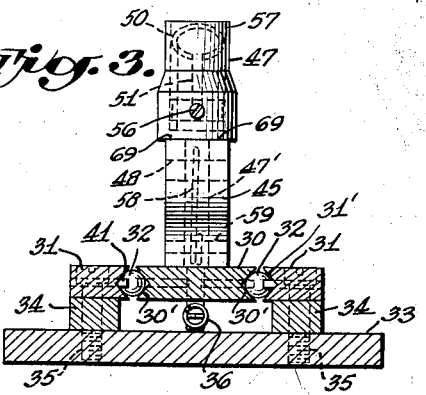
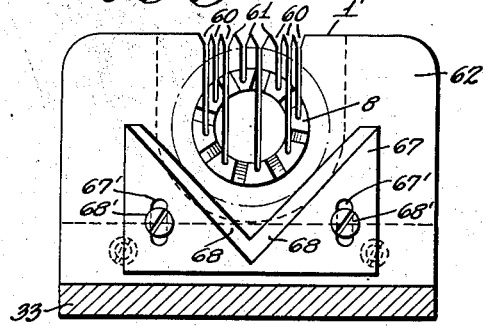
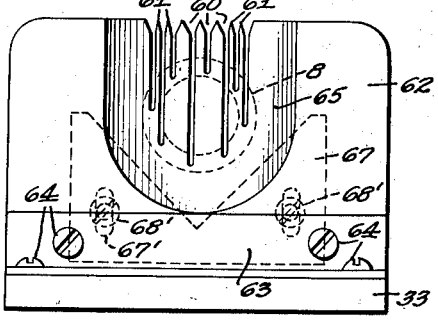
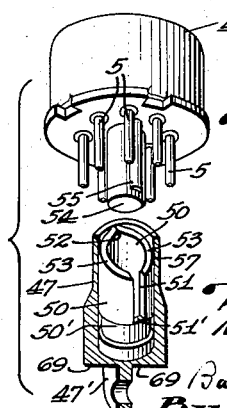
Inventors:
PAUL V. MATHIAS
MARVIN E. MUNDEL
By Bartlett, Eyre, Keel & Weymouth
Attorneys

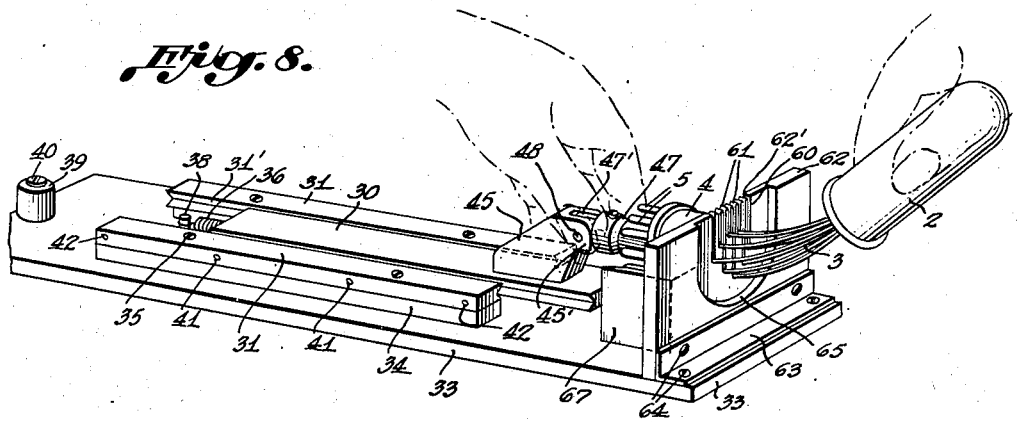
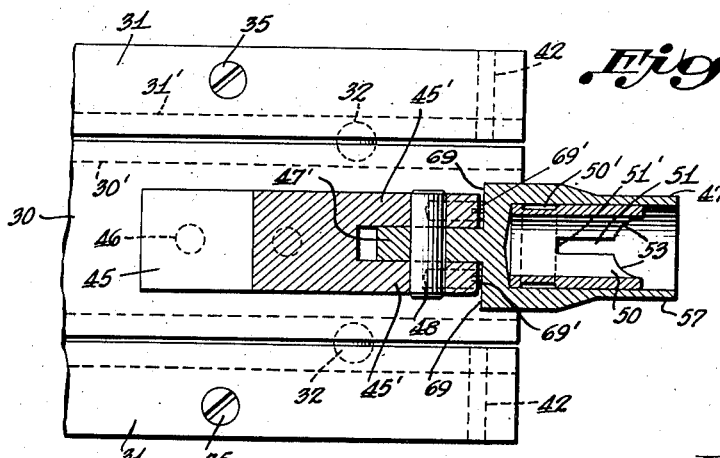
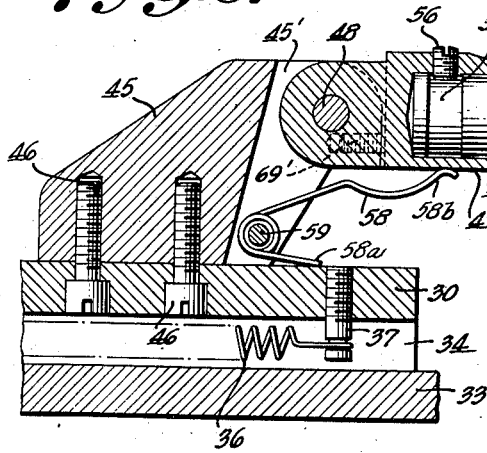
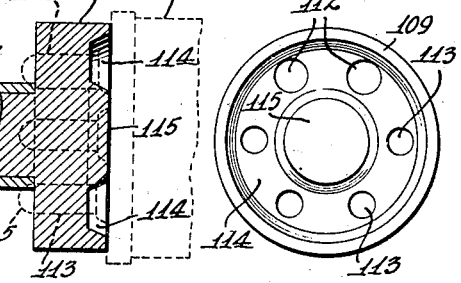
Inventors:
PAUL V. MATHIAS
MARVIN E. MUNDEL
By Bartlett Eyre Keel & Weymouth
Attorneys

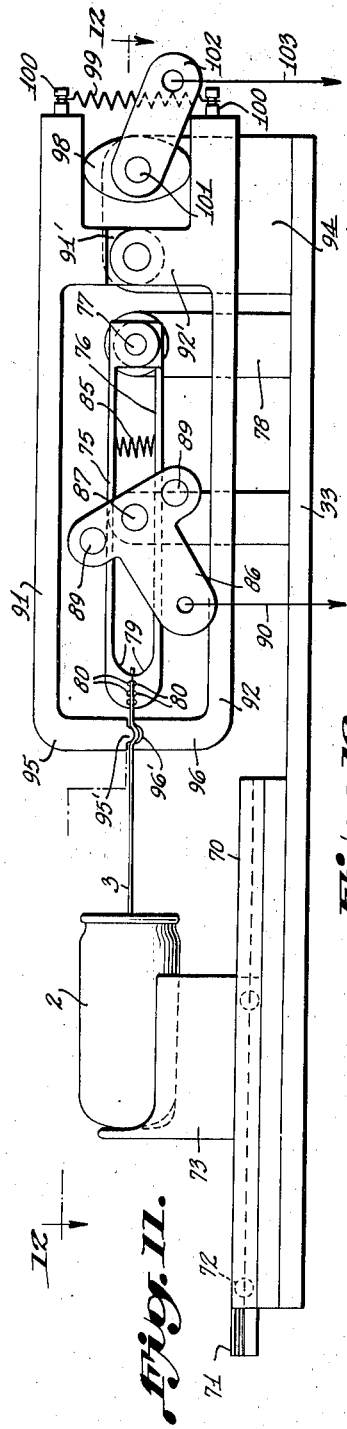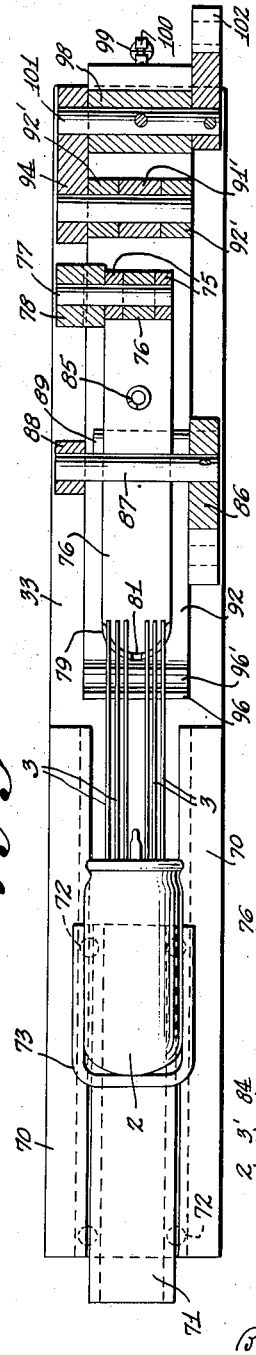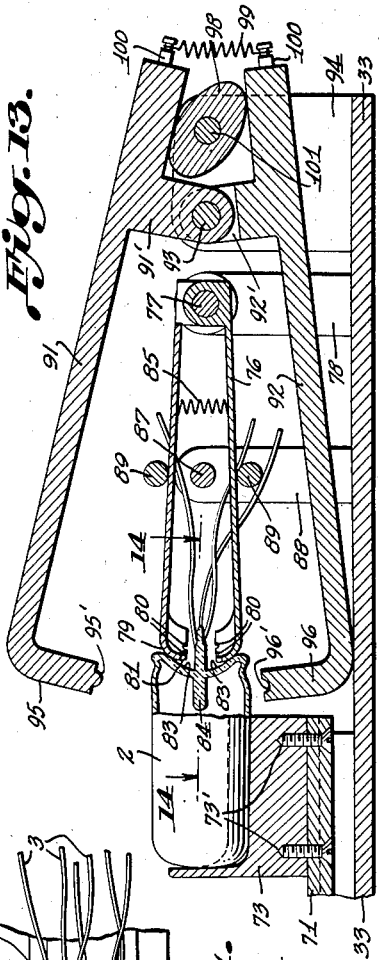

Patented Dec. 21, 1943

2,337,056

UNITED STATES PATENT OFFICE 2,337,056

APPARATUS FOR AND METHOD OF ASSEMBLING RADIO TUBES AND RADIO TUBE BASES

Paul V. Mathias, Plainville, Conn., and Marvin E. Mundel, Peoria, Ill., assignors to Tung-Sol Lamp Works, Inc., Newark, N. J., a corporation of Delaware Original application January 4, 1941, Serial No. 373,200. Divided and this application March 18, 1942, Serial No. 435,180

15 Claims. (Cl. 250—27.5)

This application is a division of our application Serial No. 373,200, filed January 4, 1941.

This invention relates to the manufacture of radio tubes, thermionic devices, and the like and particularly to apparatus for and method of assembling such devices and their bases.

The assembly of the bases on radio tubes, thermionic devices and the like involves tedious and costly steps according to the conventional practice, particularly in the threading of the leading-in conductors into the proper terminals of the multi-terminal base.

One object of the invention is a new device or apparatus and method of assembling the base upon the radio tube or other similar device with the leading-in conductors of the tube threaded into the desired terminals of the base.

A further object of the invention is a novel and improved method and means for separating and straightening the leading-in conductors of a radio tube or the like preparatory to the assembly of the base.

Further objects of the invention will hereinafter appear.

For a better understanding of the invention reference may be had to the accompanying drawings forming a part of this application, wherein Fig. 1 is a side view partly in section of a modified apparatus;

Fig. 2 is a plan view thereof;

Fig. 3 is a sectional view along the line 3—3 of Fig. 1;

Fig. 4 is a sectional view along the line 4—4 of Fig. 1;

Fig. 5 is an end view of the apparatus;

Fig. 6 is an exploded view of a radio tube shell and the orienting device, with the latter partly in section;

Fig. 7 is a plan view of the shell support, partly in section along line 7—7 of Fig. 1;

Fig. 8 is a perspective view illustrating the last step in the threading operation;

Figs. 9 and 10 are views of a modification;

Fig. 11 is a side view of an apparatus for separating and straightening the lead-in wires preparatory to the threading operation;

Fig. 12 is a plan view partly in section thereof;

Fig. 13 is a sectional view of a part thereof; and

Fig. 14 is a sectional view of a detail taken on line 14—14 of Fig. 3.

Referring to Figs. 1 to 8, the tube shell to be threaded is mounted on a movable carriage 30 which in turn is mounted to move horizontally on the trackways 31 with ball bearings 32 interposed between the tracks 31 and the carriage 30. The carriage 30 and the tracks 31 are provided with mating V-shaped trackways 30' and 31'. The trackways 31 are mounted upon a base 33 and are spaced therefrom by means of bars 34, the tracks and the bars 34 being anchored to the base 33 by any suitable means as, for example, the screw-bolts 35. The track 30 is normally urged in one direction, to the left as indicated in the drawings, by means of a spring 36, one end of which spring is fastened to a pin 37 projecting downwardly from the track 30 at the right end and the other end of the spring is fastened to a similar pin 38 projecting upwardly from the base 33. A buffer stop 39 of any suitable material as, for example, of rubber, is fastened to the left end of the base 33 and disposed in the path of the track 30 to limit its movement to the left under the influence of the spring 36. This buffer member is fastened to the base 33 in any suitable manner as, for example, by screw-bolt 40. The ball bearings 32 are retained in the raceways 30' and 31' in any suitable manner as, for example, by means of pins 41 disposed in openings formed laterally of the tracks 31 and projecting into the path of the bearings 32. Similar pins 42 are disposed within openings formed on the opposite sides and at the ends of the carriage 30. These pins 42 cooperate with the pins 41 to retain the bearings in the operative position.

The carriage has mounted on the right end thereof and on its upper side a bracket 45, which is secured to the track 30 in any suitable manner as, for example, by means of the screw bolts 46. A base shell support and positioner 47 is pivotally mounted on the bracket 45 as, for example, being pivotaly mounted on an axis 48 through the medium of a pin passing through a lug formed on the lower end of the member 47 and through openings formed in jaws 45' between which is disposed the lug on the bottom of the carrier. The lug is indicated at 47'. The axis of pivotal movement is at right angles to the direction of movement of the carriage 30, in the particular embodiment shown, and the support and positioner 47 is capable of assuming either a substantially vertical position or a substantially horizontal position as illustrated in Fig. 1. This supporting and positioning member 47 is in the form of a hollow sleeve or cup-like member and a positioner or orienting device 50 is disposed within this hollow member 47. The orienting member 50 is also of sleeve-like or cup-like form and has a longitudinal slot 51 formed in the upper part thereof. The upper end of the positioning member 50 is beveled off from a point 52 on both sides thereof downwardly to the slot 51 to form cam or guiding surfaces 53 for turning and orienting a shell 4 when the latter is positioned on the carrier. The internal diameter of the positioning member 50 is just large enough to accommodate freely the conventional projecting pin 54 carried by a shell of the type illustrated. This projecting pin 54 carries on the side thereof a key-like member 55 which is accommodated by the slot 51 formed in the positioning member 50. When the shell 4 is positioned upon the shell carrier 47 with the projecting pin 54 disposed in the upper end of the positioning and orienting member 50, the key member 55, if the shell is not properly oriented, engages one of the cam or guiding surfaces 53 to prevent the stable support of the shell in that angular position and to rotate the shell to a position wherein the key 55 can enter the slot 51. A stable and properly oriented position is reached when either the lower end of the key 55 engages the bottom 51' of the slot or the lower end of the pin 54 engages the bottom of the cup-like positioning member 50 or the shell engages the top of the carrier 47. The positioning and orienting member 50 may be angularly adjusted within the carrier 47 to give the correct orientation for the particular tube shell being worked upon, and the positioner can then be fixed in that position by means of a set-screw 56 passing through the barrel of the support 47 and engaging the outer surface of the positioner 50. In the particular embodiment shown, the positioner 50 is milled off around its exterior at 50' and the set-screw 56 is adapted to engage this milled out portion. The hollow terminal pins 5 are disposed on the outside of the carrier 47 when the shell is in its supported and oriented position and the upper end of the carrier 47 has its walls reduced as indicated at 57 to readily accommodate these terminals 5 thereabout.

The support 47 is normally urged in an upward direction by means of a spring 58 mounted on a pin 59 carried by the bracket 45 and having one end 58a engaging the track 30 and its other end 58b engaging the support 47 and tending to operate the support 47 to a vertical position.

The cooperating threading member 1' has guiding slots 60 for the lead conductors which are vertically disposed and the walls forming these slots are provided with upper guiding V's 61 to facilitate the positioning of the wires 3 within these slots 60. The member 1' is removably mounted so that it can be replaced with a different threading device corresponding, as for example, to a different type of radio tube shell.

It comprises a vertical plate 62 which is mounted at its lower edge upon the base 33 and is fastened thereto by an angle member 63, the latter being fastened to the base 33 and to the vertical plate 62 by means of the screw bolts 64. This plate 62 carries the cylindrically shaped member 8 which is preferably formed integrally therewith. This plate is cut away on the right side to form a U-shaped recess 65 and the upper edge 62' of the part 62 extends above the level of the upper part of the cylindrical member 8.

Fig. 1 shows in dot and dash line the position of the support 47 and the shell 4 when it is in position for threading. In this position the shell 4 is held in the horizontal position so as to aline the openings in terminal pins 5 with the bottoms of the slots 60 and the means for supporting the shell in the exact horizontal position is the member 67 having a V-shaped seat for the shell. This member 67 is mounted upon the plate 62 and is milled off at its outer edge to form a cam surface 66 for facilitating the operation of bringing the support 47 and shell into the correct threading position, the shell engaging and riding up the incline 68, if it should happen to be disposed slightly below the horizontal position shown in dotted lines when it is in a position to be brought over to the right. It is understood that the shell support 47 is adjusted to assume a substantially horizontal position when it is turned over to the right. When the support 47 is turned over to the right to the dotted position shown in Fig. 1 its shoulders 69 which are disposed on the opposite sides of the lug 47' (see Fig. 7) engage set screws 69' which are screw-threadedly mounted in the forks 45' of the bracket 45. These screw bolts 69' are adjusted so as to limit or prevent the movement of the support 47 below the horizontal. The V-support 67 is fastened to the plate 62 by means of bolts 68', the latter passing through openings formed in the V-support and screw-threadedly engaging openings formed in the plate 62. The openings 67' through which these bolts 68' pass are elongated in the vertical direction to permit up and down adjustment of the support 67.

The movable support thus forms the orienting means for imparting to the shell 4 the correct angular position and the supporting means 67 performs the function of horizontally alining the terminal pins 5 with the bottoms of the slots 60. In operation, the operator positions the shell 4 with the pin 54 in the upper end of the positioner 50. The shell 4, either by its own weight or by positive rotation by the operator, will be rotated to a position where the key 55 registers with and enters the slot 51. The operator then engages the bracket 45 and the support 47, or either of these, and with the support 47 pivoted over against the tension of the spring 58 into a substantially horizontal position to the right, as indicated in Fig. 1, at the same time moves the carriage over to the right against the tension of the spring 36 to cause the terminal pins 5 to register with the bottoms of the slots 60, the barrel 8 being disposed in the shell and engaging the bottom of the shell with the terminals properly alined. At the same time the operator has positioned the lead wires 3 within the slots 60 with the ends of the wires engaging the bottoms of the grooves and when the shell is brought to the threading position the ends of the lead wires are caused to enter the terminals 5 as described in the aforesaid application. The operator uses one hand to manipulate the shell and support 47, and the other to manipulate the tube and wires 3 (Fig. 8).

In the embodiment of Figs. 9 and 10 the orienting member 109 comprises a solid cylindrical member 110 which is disposed within the support 47, this member being angularly adjustable by releasing the set screw 56, the latter engaging the groove 50' formed on the periphery of the member 110. The orienting member 109 is adapted to accommodate a different type of shell from that shown in Fig. 6. This shell 111 is provided with the plug terminals 5 but does not embody the central pin 54. The positioner or orienting member 109 is provided with openings 112 and 113 for the reception of the plug terminals 5 of the shell, and the shell is simply positioned on the member 109 with the plug terminals 5 passing through these openings 112 and 113. On its outer face the member 109 is provided with an annular groove 114 from which the openings 112 and 113 extend, thereby leaving in the center an abutment 115 which supports the central part of the shell 111. It is observed that the openings 112 are larger than the openings 113 and these form a guide for the operator to facilitate the correct orientation of the shell. The operator merely drops the shell 111 on this support 109 with the plug terminals of the shell corresponding to the openings 112 passing therethrough, whereupon she rotates the support 47 over to the right against the tension of the spring 58, similarly to the operation described above with respect to Figs. 2 to 8. It is understood that in Fig. 9 the support 47 is positively held in the position there shown against the tension of spring 58.

An important step in the threading operation is the straightening and stretching of the wires 3 prior to the step of positioning these wires within the slots 60. A method and apparatus for carrying out this step of the threading operation is shown in Figs. 11 to 14. The apparatus for effecting this operation comprises a base frame 33, which may be separate from or a continuation of the base 33 shown in Figs. 2 to 5. Upon this base is mounted a track 70 generally similar to the track 31 described above, and between or on this track a carriage 71 is mounted for movement back and forth. At 72 are diagrammatically indicated ball bearings or rolling pins disposed between the tracks 70 and the carriage 71 for facilitating movement of the carriage. The carriage carries a seat or mount 73 for a radio tube 2. The radio tube 2 is supported freely on this seat 73 and is movable with the carriage to and from a straightening and stretching mechanism shown mounted to the right of the track 70 on the base 33.

This mechanism comprises a pair of separator jaws 75, 76 which are pivotally mounted at one end on a carrying pin 77, the latter being carried by a bracket or support member 78 projecting upwardly from the base 33. The left ends of these separator jaws 75 and 76 are provided with inwardly turned gripping and separating elements 79, these elements 79 being provided with matching or mating recesses 80 to accommodate the lead-in conductors when the two jaws are brought together. Each of these gripping parts 79 is also provided with a centrally disposed mating notch or recess 81 to accommodate the exhaust tube 82 of the radio tube. The gripping parts 79 are rounded off to conform to the exterior curvature of the press 84; that is, when the jaws 75 and 76 are brought together with their gripping parts 79 engaged, the exterior surface of the gripping parts 79 form a substantially snug fit with the curved end part 83 of the tube. Accordingly, irrespective as to what extent the wires 3 may be twisted and misplaced, as indicated in Fig. 14, the separator jaws 75, 76 engage or embrace the roots of these wires 3 at the points where they emerge from the press 84, and, by relatively moving the tube and the jaws 75, 76, the wires 3 are separated from each other. For facilitating the operation of the jaw members 75 and 76, there is provided a spring 85 diagrammatically shown and engaging the inner sides of the separating jaw members 75, 76 and applying a force thereto tending to separate the gripping parts 79 from each other. For bringing the gripping parts 79 of the jaws together against the tension or force of the spring 85, there is provided an operating member 86 which is pivotally mounted on a pin 87 carried by a support 88, which is mounted on the base 33. The pin 87 passes between the jaw members 75 and 76 and the operating member 86 is provided with pins 89 which engage the outer surfaces of the separating jaws 75 and 76 to bring the gripping parts 79 together when the operating member 86 is rocked about the axis of the pin 87. This rocking of the member 86 may be effected in any suitable manner, as for example, manually, and at 90 there is shown a manually operated means which extends, as for example, to an operating foot pedal (not shown for convenience in illustration).

For facilitating the separating and straightening operation of the wires there is illustrated a pair of straightening jaw members 91 and 92 having inwardly projecting pivotal bracket members 91' and 92' for pivoting on a carrying pin 93. The latter is carried by a plate or bracket member 94 mounted on the base 33. The straightening jaw members 91 and 92 are provided with mating inwardly turned gripping parts 95 and 96, which are adapted to be brought together to grip the wires 3 therebetween and apply a stretching and straightening operation thereto. In the particular embodiment shown, these gripping parts 95 and 96 are provided with mating male and female parts 95' and 96', but it is understood that any form of gripping surface may be provided, the purpose being to grip the wires tightly so as to apply a stretching and a straightening operation thereto as relative movement is imparted to the straightening jaws and the radio tube 2. The members 91, 92, 95, 96, when actuated to grip the leads wholly surround the spacing members 75, 76.

The straightening jaws 91 and 92 may be operated in any suitable manner, as for example, by a cam member 98 engaging projecting ends of the supporting jaw members 91 and 92 beyond the pivot pin 93. A tension spring 99 is fastened to pins 100 on the ends of the jaws 91 and 92 and tends to separate the gripping parts 95 and 96. The cam 98 is mounted on a pin 101 which is carried by the plate or bracket 94, the cam being keyed or fastened to the pin which forms a shaft rotating in an opening or bearing formed in the member 94. The cam 98 may be operated in any suitable manner, as, for example, manually, and there is illustrated an arm 102 projecting from the cam and having an operating means 103 illustrated diagrammatically and extending to a foot pedal (not illustrated for convenience in illustration).

The operation of the mechanism shown in Figs. 11 to 14 inclusive is as follows:

The operator positions a radio tube 2 upon the seat 73 with its wires criss-cross and twisted together as indicated somewhat in Fig. 14. With the supporting jaws 75 and 76 and the straightening members 91 and 92 separated and disposed in the inoperative position as shown in Fig. 13, the operator brings the radio tube and its carriage to the position shown in Fig. 13. In this position the gripping parts 79 are brought more closely together and simultaneously with their engagement to embrace the wires, the tube 2 is brought to the position shown in Fig. 14 with the mating notches 80 of the jaws 79 engaging or surrounding the individual wires 3 at their emergence from the press 84. The gripping jaws 79 are held in this position and the radio tube and its carriage are slightly withdrawn to a position to clear the gripping parts 95 and 96 of the jaw members 91 and 92. The gripping parts 95, 96 then are brought together against the tension of the spring 99 and caused to engage the wires 3 at a point between the tube 2 and the jaws 79. These jaws 95 and 96 are caused to grip the wires sufficiently tight to enable a stretching and straightening force to be applied thereto as the tube and the jaws are relatively separated. The operator thereupon forcefully withdraws the radio tube 2 while the gripping jaws are all in operative position, the jaws 79 separating the wires as the relative separation movement proceeds and the jaws 95 and 96 applying force to the wires to tension and straighten them. In this operation the wires 3 are not only separated from each other but are set so that they remain separated while the operator then proceeds to thread the wires into the shell as described above. The grippers 79 preferably embrace without tightly engaging the wires 3, so as not to rupture the welds 105 between the lead extensions 3 and the lead-in wires 3' proper.

We claim:

1. The method of threading the leading-in conductors of a radio tube and the like into a base, which consists in simultaneously separating and applying a stretching and straightening tension to the leading-in wires, positioning the ends of the leading-in wires into guiding and alining recesses formed in a suitable device and positioning the base shell adjacent said device with the terminals thereof alined with the recesses and moving the leading-in wires endwise into the base terminals.

2. The method of assembling bases with multiple terminals on radio tubes and the like having multiple leading-in conductors comprising the separating and straightening of the leading conductors of a radio tube, the positioning of the leading-in conductors laterally thereof into guiding and alining vertical grooves and supporting, alining and relatively moving a base shell to cause the leading-in conductors to enter the terminals.

3. A means for preparing the leading-in wires of a radio tube and the like for a base threading operation comprising a pair of cooperating wire separating members shaped generally conformably to the shape of the seal end of the radio tube and embracing the wires at their point of emergence from the radio tube, and one of said members having separate spaced notches accommodating the leading in wires whereby upon relative movement between the tube and said separating members, the wires are separated.

4. A means for preparing the leading in wires of a radio tube and the like for a base threading operation, comprising a pair of cooperating wire separating members shaped generally conformably to the shape of the sealed end of the radio tube and embracing the wires at their point of emergence from the radio tube, one of said members having separate spaced notches accommodating the leading in wires, and means for gripping the wires at a point between said members and the tube to apply tension thereto upon relative movement of the tube whereby upon relative movement between the tube and said separating members, the wires are simultaneously caused to be separated and tensioned.

5. A means for preparing the leading in wires of a radio tube and the like for a base threading operation, comprising a pair of cooperating wire separating members embracing the wires at their point of emergence from the radio tube, the ends of said cooperating wire separating members being shaped when mated generally conformably to the shape of the sealed end of the radio tube and having means thereon for separating and spacing the wires whereby upon relative movement between the tube and said separating member, the wires are separated.

6. A means for preparing the leading in wires of a radio tube and the like for a base threading operation, comprising a pair of cooperating wire separating members embracing the wires at their point of emergence from the radio tube, the ends of said cooperating wire separating members being shaped when mated generally conformably to the shape of the sealed end of the radio tube and having means thereon separating and spacing the wires, and operating means causing said members to embrace the wires at their point of emergence from the tube, whereby upon relative movement between the tube and said separating members the wires are separated.

7. A means for preparing the leading in wires of a radio tube and the like for a base threading operation, comprising a pair of cooperating wire separating members embracing the wires at their point of emergence from the radio tube, the ends of said cooperating wire separating members being shaped when mated generally conformably to the shape of the sealed end of the radio tube and having means thereon separating and spacing the wires, spring means moving said cooperating members relatively to each other, and power means operating in opposition to said spring means moving the cooperating members in the opposite direction, whereby upon relative movement between the tube and said separating member the wires are separated.

8. A means for preparing the leading in wires of a radio tube and the like for a base threading operation, the sealed end of said tube having a concave surface with the leading in wires passing outwardly therethrough, comprising a pair of cooperating wire separating members embracing the wires at their point of emergence from the tube, the said members when mated being shaped to conform generally to the concave surface of the sealed end of the tube and having mating edges which separately embrace the leading in wires at their point of emergence, whereby upon relative movement between the tube and the separating members the wires are separated.

9. A means for preparing the leading in wires of a radio tube or the like for a base threading operation, comprising a pair of cooperating wire separating members embracing the wires at their point of emergence from the radio tube, the ends of said cooperating wire separating members being shaped when mated generally conformably to the shape of the sealed end of the radio tube and having means thereon for separating and spacing the wires whereby upon relative movement between the tube and said separating member, the wires are separated, means being provided applying a straightening and tensioning force to the spaced wires at a point between the tube and the separating members simultaneously with the relative movement between the tube and the members, said tensioning and straightening means comprising a pair of gripping jaws surrounding the separating members and accommodating a tube for bringing the latter into wire spacing relation with said members.

10. A means for preparing the leading in wires of a radio tube or the like for a base threading operation, comprising a pair of cooperating wire separating members embracing the wires at their point of emergence from the radio tube, the ends of said cooperating wire separating members being shaped when mated generally conformably to the shape of the sealed end of the radio tube and having means thereon for separating and spacing the wires whereby upon relative movement between the tube and said separating member, the wires are separated, means being provided applying a straightening and tensioning force to the spaced wires at a point between the tube and the separating member simultaneously with the relative movement between the tube and the members, said tensioning and straightening means comprising a pair of gripping jaws surrounding the separating members and accommodating a tube for bringing the latter into wire spacing relation with said members, and spring means for moving said gripping jaws in one direction and cam means for operating the same in the opposite direction against said spring.

11. In a means for simultaneously spacing, straightening and tensioning leading in wires of a radio tube, the combination of means for embracing, separating and spacing the leading in wires upon relative movement of a tube, and separate means for gripping and applying tension to the wires simultaneously with the separating and spacing operation.

12. In an apparatus for separating, straightening and tensioning the leading in wires of a radio tube and the like, two pairs of cooperating members, one of said pairs of members embracing the wires of the tube at their point of emergence therefrom and separating the same upon relative movement of the tube and a second pair of cooperating members gripping the said wires at a point between the said first pair and the radio tube, and means for operating said pairs of cooperating members.

13. In an apparatus for separating, straightening and tensioning the leading in wires of a radio tube or the like, two pairs of cooperating members, one of said pairs of members embracing the wires of the tube at their point of emergence therefrom and separating the same upon relative movement of the tube, and the second pair of cooperating members gripping the said wires at a point between the said first pair and the radio tube, and means for operating said pairs of cooperating members, the cooperating straightening and tensioning members being carried by arms surrounding the first named pair of cooperating members.

14. In a means for simultaneously spacing, straightening and tensioning leading in wires of a radio tube and the like the combination of a pair of cooperating wire separating members embracing the wires at their point of emergence from the radio tube, the ends of said separating members being shaped when brought together in wire spacing relation generally conformably to the shape of the sealed end of the radio tube and having means thereon separating and spacing the wires, means supporting a radio tube in operative relation to the wire separating members, a pair of tensioning and straightening jaws disposed to grip the wires at a point between the tube supporting means and the separating members, said radio tube supporting means being relatively movable with respect to said members and jaws, and means operating said separating member and said jaws to cause them to embrace the wires.

15. In a means for separating and spacing the leading in wires of a radio tube and the like, the combination of a pair of wire separating and spacing members embracing the wires at their point of emergence from the radio tube, the ends of said separating members being shaped when brought together in wire spacing relation generally conformably to the shape of the sealed end of the radio tube and having means thereon separating and spacing the wires, means supporting a radio tube in operative relation to the wire separating members, said tube supporting means being relatively movable with respect to said members, and means operating the latter to cause them to embrace the wires.

PAUL V. MATHIAS.
MARVIN E. MUNDEL.